Nov. 1, 1932.     G. W. McKEE     1,885,367
CONTROL DEVICE
Filed Feb. 5, 1930
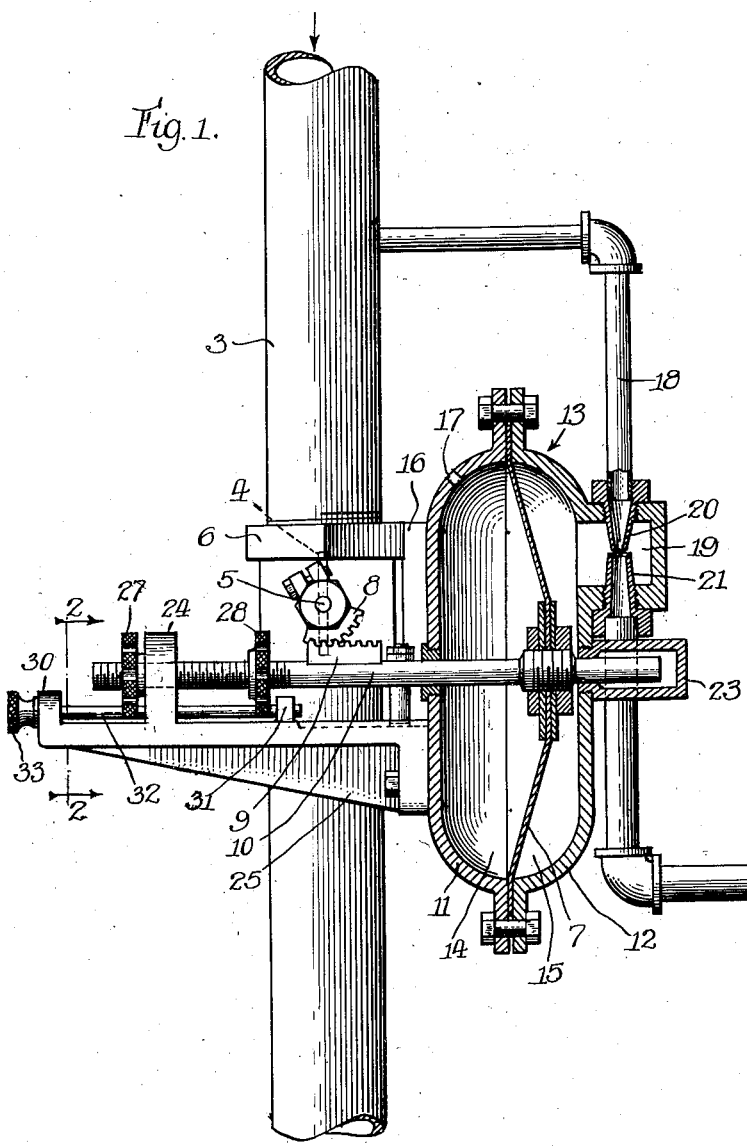
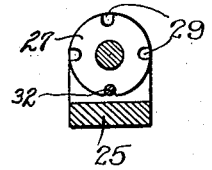
Fig. 2.
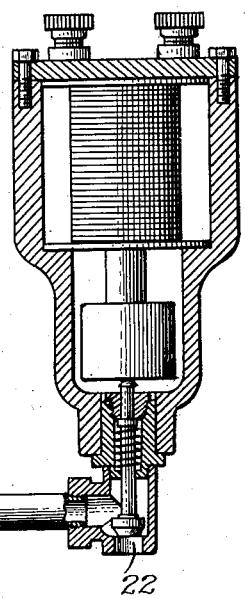
Inventor
Garnet W. McKee,
By Chindall Parker Carlson
Attys.

Patented Nov. 1, 1932

1,885,367

UNITED STATES PATENT OFFICE

GARNET W. McKEE, OF ROCKFORD, ILLINOIS

CONTROL DEVICE

Application filed February 5, 1930. Serial No. 425,991.

The present invention relates to improvements in control devices for regulating the flow of fluids, and has particular reference to devices such as the one disclosed in my copending application Serial No. 271,257 filed April 19, 1928 (Patent No. 1,779,978).

In the control device disclosed in said application, the flow of fluid through a pipe is controlled by means of a suitable valve which is operatively connected to a pressure responsive member. Movement of the member in opposite directions serves to open and close the valve.

The primary object of the present invention resides in the provision of novel means for adjusting the extent of movement of the valve under the influence of the pressure responsive member.

A more specific object is to provide a new and improved adjustable connection between the valve and the pressure responsive member which is not subject to accidental displacement, and which is simple and inexpensive in construction and easy to manipulate.

Further objects and advantages will become apparent as the description proceeds.

In the accompanying drawing, Fig. 1 is an elevational view partially in section of a device embodying the features of my invention.

Fig. 2 is a fragmentary sectional view taken along line 2—2 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention illustrated in the drawing, 3 represents a fluid supply pipe or line. Interposed in the line is a valve 4 which may be of any suitable construction and which in the present instance is in the form of a butterfly valve. The latter is mounted on a suitable shaft 5, one end of which extends diametrically out of a fitting 6 interposed in the pipe 3.

The outer end of the shaft 5 is operatively connected to a suitable pressure responsive member such as a diaphragm 7. In the present instance, this connection comprises a gear segment 8 secured on the shaft 5, a gear rack 9 meshing with the segment, and a plunger 10 on which the gear rack is mounted, and which is tightly secured to the central portion of the diaphragm 7.

The diaphragm 7 which may be of any suitable material is secured between two opposed sections 11 and 12 of a suitable casing 13, and serves to define therewith chambers 14 and 15 respectively. The casing 13 may be mounted on any suitable support, and in the present instance is secured to the fitting 6 by means of a suitable connecting member 16.

The chamber 14 communicates with the atmosphere through suitable vent means, such as the opening 17 formed in the section 11, and the chamber 15 is connected through a small by-pass or bleed line 18 to the fluid pipe 3 preferably at the high pressure side of the valve 4. In the present instance, the chamber 15 is formed with a small pocket or auxiliary chamber 19 interposed in the pipe 18.

Mounted in the chamber 19 and interposed in the line 18 is a suction creating means which preferably comprises an injector nozzle 20 and an expanding nozzle 21 in alignment. The free end of the line 18 beyond the chamber 19 is provided with a suitable valve 22 for selectively opening the line to the atmosphere and for sealing the line.

The plunger 10 extends slidably through the casing 13, the end remote from the rack 9 being disposed in a closed tube 23 tightly secured on the outside of the section 12. The other end of the plunger 10 extends through an upstanding lug or ear 24 on a bracket 25 conveniently mounted on the casing section 11. Adjustably threaded on the plunger 10 in spaced relation to and at opposite sides of the lug 24 to define the range and extent of reciprocation of the plunger, and hence the range and degree of movement of the valve 4 in opening and closing, are two suitable stop nuts 27 and 28.

One of the important features of the present invention resides in the provision of means for securing these nuts securely in position of adjustment so as to maintain the desired gas flow. To this end, each of the nuts 27 and 28 is formed with a knurled periphery and with a plurality of peripherally spaced longitudinal notches 29. In the present instance, six notches 29 are provided. Formed on the bracket 25 in spaced relation to and at opposite sides of the lug 24 are two small upstanding lugs 30 and 31. A suitable spline pin 32 having a knurled adjusting knob 33 on its outer end is adapted to be inserted through the lugs 24, 30 and 31, and in selective engagement with the notches 29 to hold the nuts 27 and 28 in position of adjustment.

In operation, when the valve 22 is closed, pressure will build up in the chamber 15, whereupon the diaphragm 7 will flex to the left to move the main valve 4 into closed or minimum flow position. Conversely, when the valve 22 is opened, the flow of fluid from the nozzle 20 into the nozzle 21 will create a suction in the chamber 15, whereupon the diaphragm 7 will flex into the position shown in Fig. 1 to open the valve 4. The extent of movement of the valve in opening or closing is determined by the relative spacing of the nuts 27 and 28. The range of movement of the valve 4 is determined by the position of the nuts 27 and 28 relative to the lug 24. To maintain the desired flow of gas through the line 3, it is essential that the nuts 27 and 28 be held securely in position of adjustment. This is accomplished by means of the pin 32 and the coacting notches 29. In general, the locking means for the nuts 27 and 28 is easy to manipulate, certain in action, and simple in construction.

I claim as my invention:

1. In combination, a support, a plurality of parallel aligned lugs on said support, a plunger reciprocable through one of said lugs, means for actuating said plunger, means operatively connected to said plunger for actuation thereby, a pair of stop nuts threaded on said plunger at opposite sides of said last mentioned lug, each of said nuts being formed with a plurality of notches in its periphery, and a spline pin extending removably through said lugs along said plunger, and selectively engaging in said notches.

2. In combination, a support, a fixed stop on said support, a plunger reciprocable in said stop, means for actuating said plunger, a valve operatively connected to said plunger, a pair of stop nuts adjustably threaded on said plunger at opposite sides of said stop, each of said nuts having a longitudinal notch in its periphery, and a spline pin removably mounted on said support and when in position engaging said notches to lock said nuts against adjustment on said plunger.

3. In combination, a support, a fixed stop on said support, a member slidable relatively to said stop, a stop nut adjustably threaded on said member, said nut being movable axially into and out of abutting engagement with said stop upon movement of said member respectively in opposite directions to limit the movement of said member in one direction and being formed with a notch in its periphery extending longitudinally of its axis, and a locking pin removably mounted on said support and engaging in said notch, said pin extending in the direction of movement of said member and serving to hold said nut against rotation in all positions of axial adjustment.

4. In combination, a support, a fixed stop on said support, a member extending slidably through said stop, a movable stop adjustably threaded on said member, said movable stop being movable into and out of abutting engagement with said fixed stop upon movement of said member in opposite directions to limit the range and extent of movement of said member in one direction and being formed with a recess extending in the direction of movement of said member, and a locking pin removably mounted on said support, and when in position having a spline engagement with said recess to hold said movably stop against rotation in all positions of movement with said member.

5. In combination, a support, a fixed stop on said support, a member slidable relative to said stop, a movable stop adjustably threaded on said member, said movable stop being movable into and out of abutting engagement with said fixed stop upon movement of said member in opposite directions to limit the range and extent of movement of said member in one direction and being formed with a recess extending in the direction of movement of said member, and a locking member removably mounted on said support and extending in the direction of movement of said first mentioned member, said locking member when in position having a spline engagement with said recess to lock said movable stop against adjustment on said first mentioned member in all positions of movement of said member.

6. A control device comprising, in combination with a fluid supply pipe, a pivotal valve in said pipe for controlling the flow of fluid therethrough, a casing mounted on said pipe, a pressure responsive member disposed in said casing, a plunger secured to said member and slidably mounted in said casing, one end of said plunger extending beyond said casing and carrying a gear rack, a gear segment on said valve in mesh with said gear rack, a bracket mounted on said casing and extending along said plunger, said bracket being formed with a laterally projecting lug, said plunger extending slidably through said lug, a pair of nuts threaded on said plunger at opposite sides of said lug, said nuts being formed with a plurality of peripheral notches, a plurality of additional lugs formed on said bracket, and a locking pin removably inserted in said lugs and when in position adapted to selectively engage in said notches to hold said nuts in position of adjustment on said plunger.

7. A control device comprising, in combination with a fluid supply pipe, a pivotal valve in said pipe for controlling the flow of fluid therethrough, a plunger having a gear connection with said valve, a bracket formed with a plurality of laterally projecting lugs, said plunger extending slidably through one of said lugs, a pair of nuts threaded on said plunger at opposite sides of said last mentioned lug, said nuts being formed with a plurality of peripheral notches, and a locking pin removably inserted in said lugs and when in position adapted to selectively engage in said notches to hold said nuts in position of adjustment on said plunger.

8. In combination, a support, a plurality of parallel alined lugs on said support, a plunger reciprocable through one of said lugs, a pair of stop nuts threaded on said plunger at opposite sides of said last mentioned lug, each of said nuts being formed with a plurality of notches in its periphery, and a spline pin extending removably through said lugs along said plunger, and selectively engaging in said notches.

9. In combination, a support, a fixed stop on said support, a plunger reciprocable in said stop, a pair of stop nuts adjustably threaded on said plunger at opposite sides of said stop, each of said nuts having a longitudinal notch in its periphery, and a spline pin removably mounted on said support and when in position engaging said notches to lock said nuts against adjustment on said plunger.

10. In combination, a support, a stop on said support, a member reciprocable relatively to said stop, a pair of stop nuts adjustably threaded on said member at opposite sides of said stop for movement therewith selectively into engagement with said stop, each of said nuts having a recess, and a spline pin removably mounted on said support and extending in the direction of reciprocation of said member and when in position engaging slidably in said recesses to lock said nuts against rotation on said member.

11. In combination, an elongated support, a lug on said support, said lug constituting a stop, a non-rotatable plunger reciprocable longitudinally of said support past said stop, a pair of stop nuts threaded on said plunger respectively at opposite sides of said stop, each of said nuts being formed with a plurality of notches in its periphery, and a spline pin removably mounted on said support, and when in position adapted to engage selectively in said notches to hold said nuts against rotation on said plunger in various positions of reciprocation of said plunger.

12. In combination, a fixed support, a stop on said support, a movable support movable in opposite directions relative to said stop, a stop on said movable support and adapted for engagement with said first mentioned stop to limit the movement of said movable support in one direction, one of said stops being adjustably threaded on its support and having a recess extending in the direction of relative movement of said supports, and a locking means removably mounted on the support for the other member, said locking means when in position having a spline engagement with said recess to lock said adjustable stop against adjustment in the relative movement between said supports.

13. In combination, a support, a stop on said support, an elongated non-rotatable rod mounted for reciprocation relative to said stop, a stop nut adjustably threaded on said rod, said nut being formed with a plurality of peripherally spaced notches, and a locking pin removably mounted on said support and adapted when in position to engage in one of said notches, said pin extending in the direction of reciprocation of said rod and serving to hold said nut against rotation during said reciprocation.

14. In combination, a support, a fixed stop on said support, a plunger reciprocable in said stop, means for reciprocating said plunger, a gear rack longitudinally secured on said plunger, a rotary gear member meshing with said rack, a valve operatively connected to said gear member, a pair of stop nuts adjustably threaded on said plunger at opposite sides of said stop, each of said nuts having a longitudinal notch in its periphery, and a spline pin removably mounted on said support and when in position engaging said notches to lock said nuts against adjustment on said plunger.

In testimony whereof, I have hereunto affixed my signature.

GARNET W. McKEE.